(No Model.)

J. D. CAMP.

METHOD OF AND APPARATUS FOR SEPARATING APPLE SEEDS FROM POMACE.

No. 280,130.  Patented June 26, 1883.

WITNESSES:
Chas. T. Howell,
C. Sedgwick

INVENTOR:
J. D. Camp
BY
ATTORNEYS.

UNITED STATES PATENT OFFICE.

JOSEPH DIX CAMP, OF EAST RANDOLPH, VERMONT.

METHOD OF AND APPARATUS FOR SEPARATING APPLE-SEED FROM POMACE.

SPECIFICATION forming part of Letters Patent No. 280,130, dated June 26, 1883.

Application filed April 23, 1883. (No model.)

*To all whom it may concern:*

Be it known that I, JOSEPH DIX CAMP, of East Randolph, in the county of Orange and State of Vermont, have invented a new and Improved Method of and Apparatus for Separating Apple-Seed from Pomace, of which the following is a full, clear, and exact description.

My invention consists of a method of treatment of the pomace from cider-mills to cause the seeds to separate from the pomace, and an improved contrivance of apparatus for washing the pomace to cause the separation, all as hereinafter fully described.

Reference is to be had to the accompanying drawings, forming part of this specification, in which similar letters of reference indicate corresponding parts in both the figures.

Figure 1:
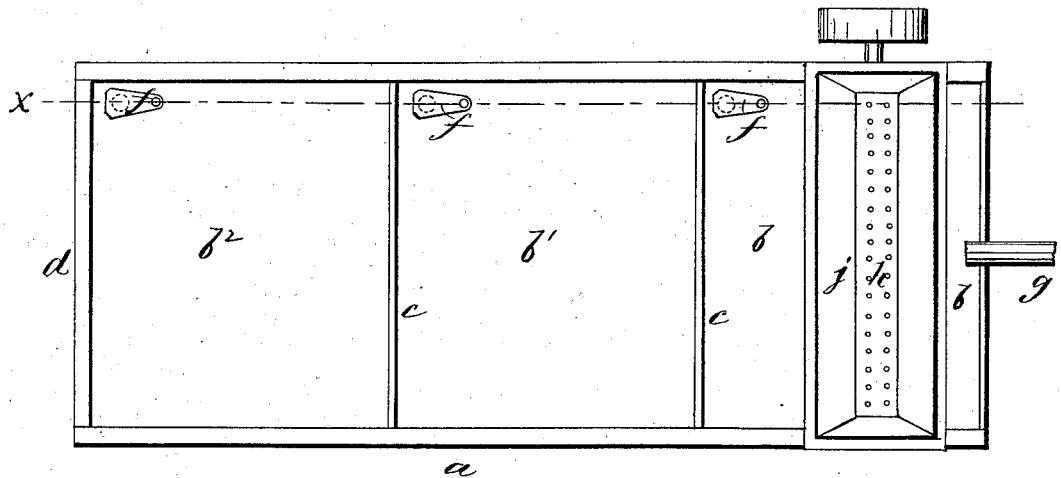
Figure 2:
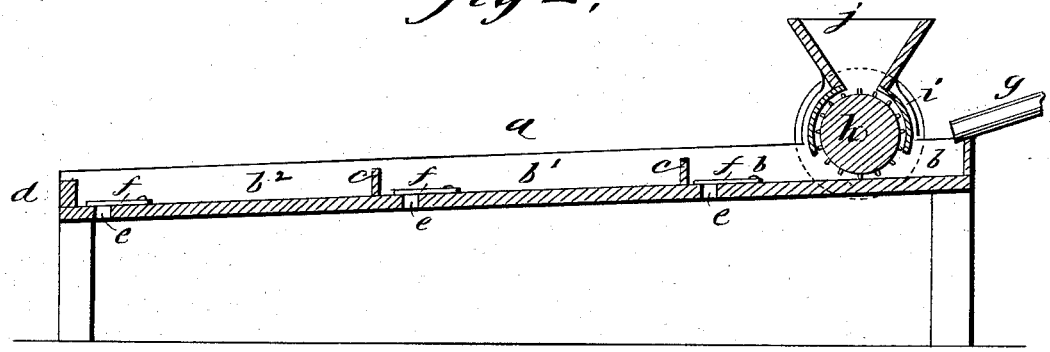

Figure 1 is a plan view of my improved apparatus, in which I prepare the pomace for the separation of the seed, and Fig. 2 is a longitudinal sectional elevation of the same.

I make a long, wide, but shallow and level or slightly-sloping tank, $a$, which I divide into, say, three sections, $b$ $b'$ $b^2$, by two partitions, $c$, of less height than the sides, and also make the lower end, $d$, of less height, to allow water used for washing the pomace and supplied to the tank at the upper end by a spout, $g$, to flow from one section to another and escape over the lower end. At one corner of the lower side of each section of the tank, I provide a passage, $e$, for drawing off the remaining water, when required, with a valve, $f$, to open and close said passages. Into the upper section of this tank, which I locate near the cider-press for convenience, I deliver the pomace, which I first pick and separate from the caky and lumpy condition into its particles, either by handling it with a fork or running it through a picker consisting of a toothed cylinder, $h$, and a case, $i$, and hopper $j$, which is the most preferable means, the cylinder being armed with wood or iron pegs and swiftly revolved by any approved power; and I prefer to deliver the pomace into said tank by discharging it into the spout $g$, through which a stream of water is to flow for treating the pomace in the tank, in order that the water will be mixed with the pomace so much better to begin with; but the pomace and the water may be separately supplied to the tank, if preferred. In this way I run through one or more "cheeses," consisting of a residual cake of pomace from the press, and wash the seeds free of the sticky matters causing them to adhere to the pomace, also saturate the pomace, so that it will rather tend to float or be held up by the water, while the seeds fall or tend downward. Then I clear the corner of each section of the tank where the valve is, and open it and let the water drain out, the supply through the spout $g$ being shut off. Then I fill a barrel or other approved vessel about half-full of the washed pomace, and fill the rest with water and stir rapidly with a stick until the whole is in rapid motion; then pour off, repeating as many times as is necessary, refilling with water when required until the water is clear of pomace and the seeds have settled to the bottom. Then I pour off the water and spread out the seeds in a suitable place to dry. Thus I can effectually separate and remove all the pomace and wash the seed clean in a simple way, that may be carried out at the press, provided water can be had thereat, and thereby considerably cheapen the preparation of the seed for market.

Having thus described my invention, I claim as new and desire to secure by Letters Patent—

1. The method of separating apple-seed from pomace by a preparatory washing process in a tank contrived for a flow of water along the surface, and subsequently stirring the previously-washed pomace in vessels of water, and pouring off the pomace from time to time, substantially as described.

2. The improved apparatus for washing pomace, consisting of a sectional inclined tank, having an inlet for water, partitions, and an overflow-discharge contrived for the flow of water at the surface only, and also having the drain-passages $e$ and valves $f$, substantially as described.

3. The improved apparatus for washing pomace, consisting of a picking or disentegrating apparatus, substantially as herein described, in combination with a sectional inclined tank having an inlet for water, partitions, and overflow-discharge contrived for the flow of the water at the surface only, and also having the drain-passages $e$ and valves $f$, substantially as specified.

JOSEPH DIX CAMP.

Witnesses:
CHARLES W. TAFT,
CARRIE A. HERRICK.